(12) United States Patent
Osada et al.

(10) Patent No.: US 6,523,267 B1
(45) Date of Patent: Feb. 25, 2003

(54) INSULATING COVER FOR A SABER SAW

(75) Inventors: Yoshio Osada, Hitachinaka (JP); Toshihiko Tachibana, Hitachi (JP); Masato Sakai, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 09/550,073

(22) Filed: Apr. 14, 2000

(30) Foreign Application Priority Data

Apr. 16, 1999 (JP) ............................................. 11-109128

(51) Int. Cl.⁷ .......................... B23D 51/00; B23D 57/02; B23D 59/00; B27B 21/00; B27B 17/00
(52) U.S. Cl. ............................................ 30/517; 30/382
(58) Field of Search ................................. 310/89; 74/60, 74/50; 30/393, 125, 392, 382, 517; 173/178

(56) References Cited

U.S. PATENT DOCUMENTS

| | | | | |
|---|---|---|---|---|
| 3,461,732 A | * | 8/1969 | Gregory | 74/60 |
| 3,863,342 A | * | 2/1975 | Griffies et al. | 30/393 |
| 3,945,120 A | * | 3/1976 | Ritz | 30/393 |
| 4,206,657 A | * | 6/1980 | Palm | 74/50 |
| 4,976,164 A | * | 12/1990 | Lentino | 74/50 |
| 5,392,519 A | * | 2/1995 | Inoue et al. | 30/393 |
| RE35,258 E | * | 6/1996 | Palm | 30/392 |
| 5,566,458 A | * | 10/1996 | Bednar | 30/392 |
| 5,607,023 A | * | 3/1997 | Palm | 173/178 |
| 6,189,217 B1 | * | 2/2001 | Melvin et al. | 30/125 |
| 6,282,797 B1 | * | 9/2001 | Osada et al. | 30/392 |
| 6,295,736 B1 | * | 10/2001 | Dassoulas et al. | 30/392 |
| 6,308,423 B1 | * | 10/2001 | Ono | 30/37 |
| 6,317,988 B1 | * | 11/2001 | Tachibana et al. | 30/376 |
| RE37,529 E | * | 1/2002 | Bednar et al. | 30/394 |
| 6,357,125 B1 | * | 3/2002 | Feldmann et al. | 30/392 |
| 6,370,781 B1 | * | 4/2002 | Sasaki | 30/392 |

FOREIGN PATENT DOCUMENTS

| | | | |
|---|---|---|---|
| JP | 2000-052303 A | * | 2/2000 |
| JP | 2000-263504 A | * | 9/2000 |
| JP | 2000-301411 A | * | 10/2000 |

* cited by examiner

*Primary Examiner*—Nestor Ramirez
*Assistant Examiner*—Pedro J. Cuevas
(74) *Attorney, Agent, or Firm*—Connolly Bove Lodge & Hutz LLP (57) ABSTRACT

A front cover, covering an outer surface of a saber saw housing, is made of an electrically and thermally insulating rigid material. A resilient member is provided on an outer surface of the front cover partly so as to form a front-end grip to be held by a user. The friction coefficient of the resilient member is larger than that of the front cover.

9 Claims, 6 Drawing Sheets

INSULATING COVER FOR A SABER SAW

BACKGROUND OF THE INVENTION

The present invention relates to saber saws. Various saber saws have been conventionally developed to cut or saw woody or steel materials or pipes in the housing or building construction sites or similar fields. More specifically, the present invention enhances the strength of the front cover attached to a saber saw housing, and also improves the durability and safety of saber saws.

The saber saw is a sort of cutting power tool with a reciprocative plunger driven by an electric motor. A blade is attached to or detached from a front end of this plunger.

According to a power tool disclosed in the U.S. Pat. No. 5,006,740, an outer surface of the power tool is covered by an insulating cooling boot with parallel ribs spaced each other and formed on the inside wall thereof so as to provide the cooling air passage grooves, thereby improving the heat insulating properties of the power tool.

SUMMARY OF THE INVENTION

An object of the present invention is to provide a saber saw with an insulating cover structure capable of enhancing the electrical and thermal insulating properties of the saber saw as well as improving the safety performance during the sawing or cutting operation of the saber saw.

In order to accomplish this and other related objects, the present invention provides a saber saw which comprises a housing in which a motor with a cooling fan is accommodated. A secondary shaft is rotatably supported by the housing and is driven by the motor. A plunger causes a reciprocative motion with respect to the housing. A blade is attached to or detached from a front end of this plunger. A motion converting mechanism is interposed between the secondary shaft and the plunger for converting a rotational motion of the secondary shaft into a reciprocative movement of the plunger. A front cover, made of an electrically and thermally insulating material, covers an outer surface of the housing. And, a resilient member, which is also electrically and thermally insulating, extends along an outer surface of the front cover partly so as to form a front-end grip to be held by a user.

Preferably, the front cover is made of a rigid material sufficiently durable against a force imparted thereon during an operation of the saber saw.

Preferably, a friction coefficient of the resilient member is larger than that of the front cover.

In practice, it is preferable that the front cover is a high-strength plastic and the resilient member is a rubber.

Preferably, the front cover consists of a right half and a left half separated about a vertical plane lying in an axial direction of the saber saw.

Preferably, the housing comprises a motor housing accommodating the motor, an inner cover positioned next to the motor housing for supporting a front end of a motor shaft and a rear end of the secondary shaft, and a gear cover positioned next to the inner cover for accommodating the secondary shaft, the plunger, and the motion converting mechanism.

Preferably, a clearance between the front cover and the gear cover serves as a ventilation space for allowing cooling air to flow therethrough.

Preferably, the resilient member is bonded onto the front cover, or integrally formed with the front cover by injection molding.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF A PREFERRED EMBODIMENT

A preferred embodiment of the present invention will be explained with reference to FIGS. 1 to 7. Identical parts are denoted by the same reference numerals throughout the views. The directions used in the following explanation are defined based on a saber saw held in a horizontal position with a longitudinal axis extending in a horizontal direction.

Motor Section

Figure 1:
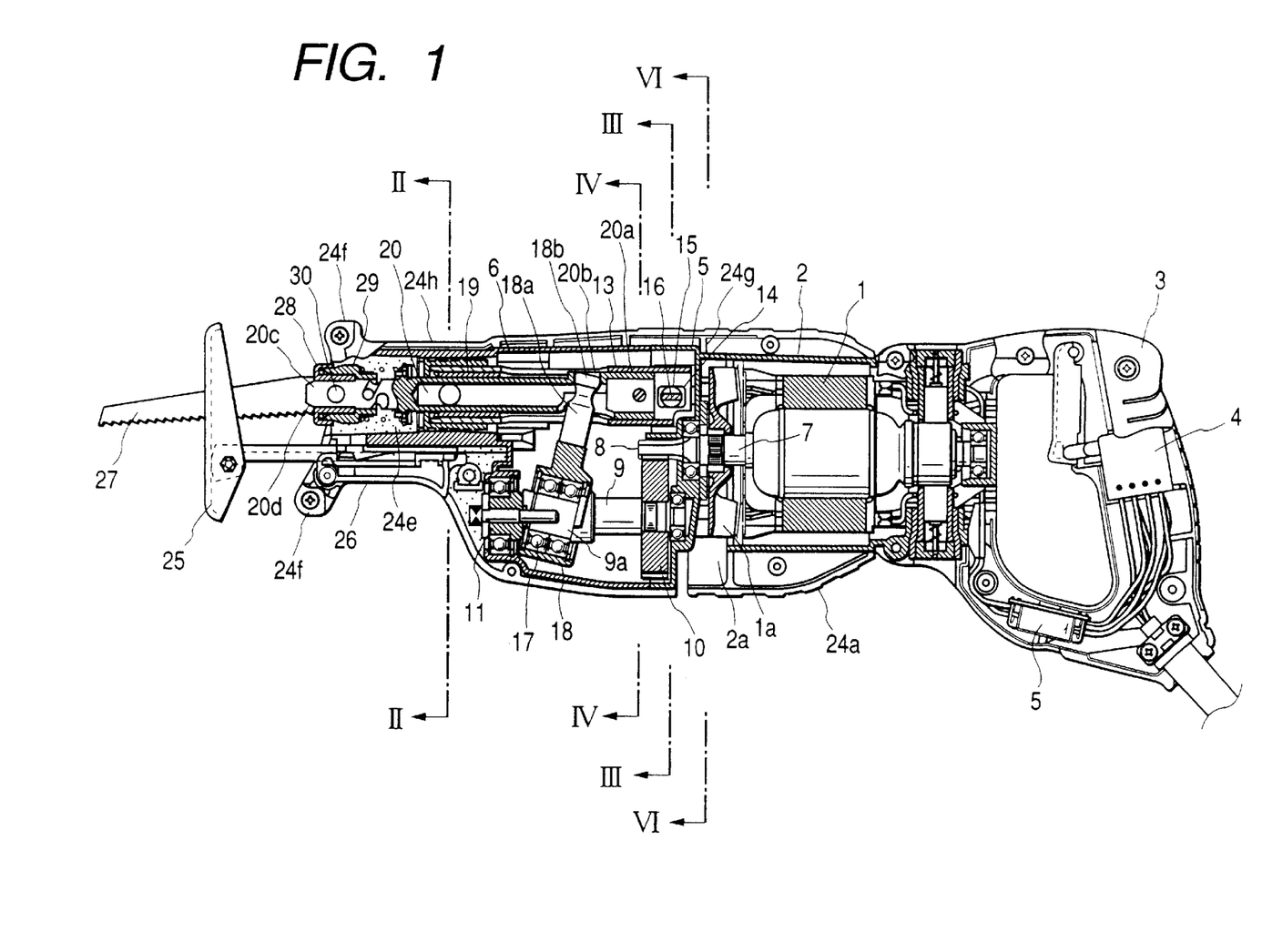
FIG. 1 is a partly cross-sectional side view showing a saber saw in accordance with a preferred embodiment of the present invention.
Figure 5:
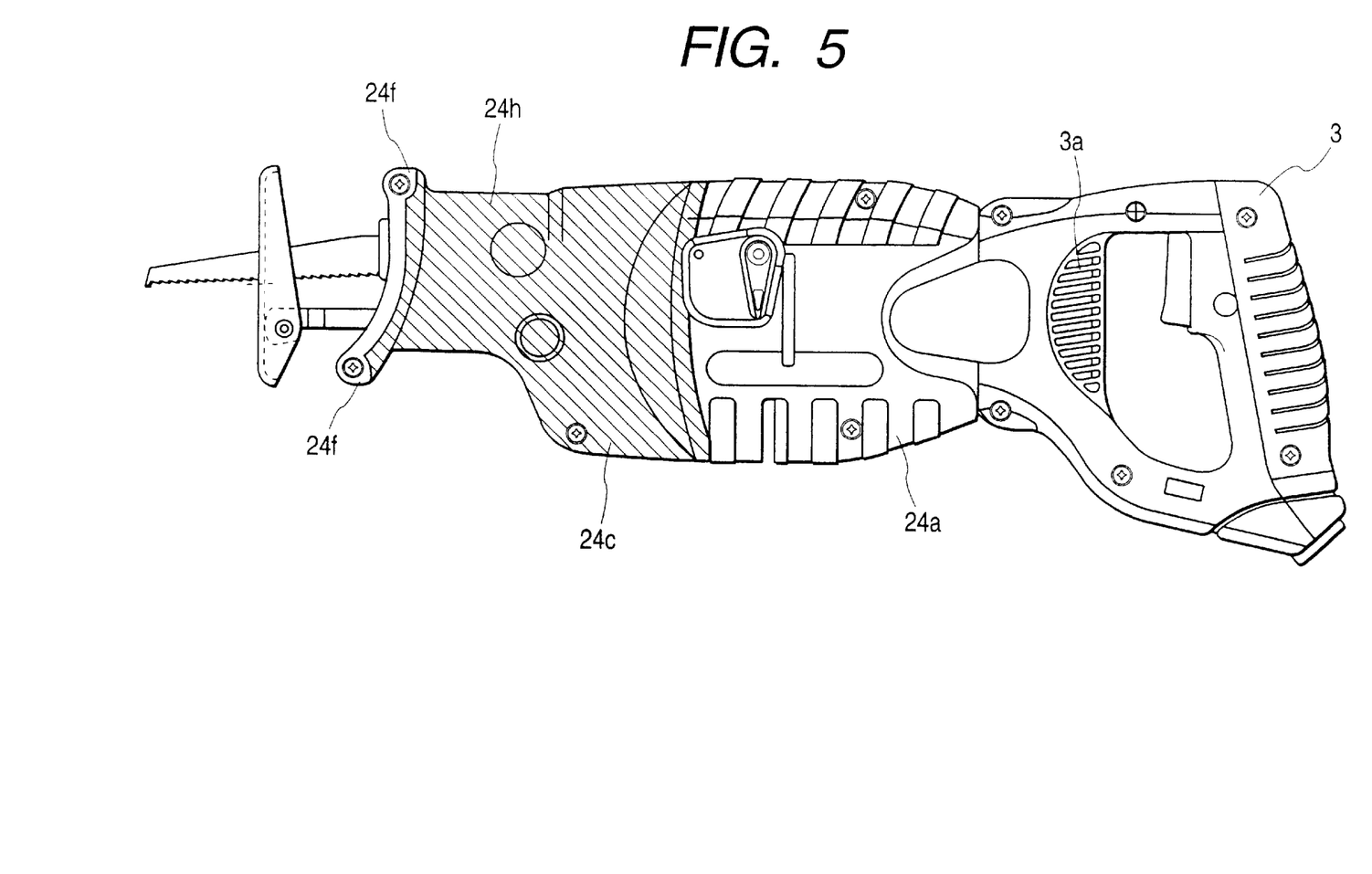
FIG. 5 is a side view showing a front-end grip of the saber saw in accordance with the preferred embodiment of the present invention.

As shown in FIGS. 1 and 5, an electrically driven motor 1 with a cooling fan 1a is accommodated in a resin motor housing 2. A handle 3 is connected to the rear end of the motor housing 2. A plurality of ventilation inlets 3a, through which cooling air is introduced, are provided on side surfaces of the handle 3. The handle 3 is equipped with a switch 4 which on-and-off controls the power supply to the electric motor 1. An inner cover 5, which is an aluminum product, is connected to the front end of the motor housing 2. A ventilation outlet 2a, through which the cooling air is exhausted, is provided at a connecting portion of the motor housing 2 and the inner cover 5.

Speed-reducing Mechanism

A gear cover 6, which is an aluminum product, is connected to the front end of the inner cover 5 for accommodating a driving force transmitting mechanism. The electric motor 1 has a motor shaft 7 serving as a rotary member outputting a rotational driving force of the electric motor 1. A driving gear 8 is formed at the front end of the motor shaft 7. A secondary shaft 9 is positioned in parallel with the motor shaft 7. The inner cover 5 supports the front end of motor shaft 7 and the rear end of secondary shaft 9. A driven gear 10 is attached on the secondary shaft 9 so as to mesh with the driving gear 8. The driving gear 8 and the driven gear 10 cooperate as a speed reducing mechanism. Thus, the rotational force of electric motor 1 is transmitted to the secondary shaft 9 via the speed reducing mechanism. The secondary shaft 9 rotates at a reduced speed. A slant shaft 9a is formed at the front end of the secondary shaft 9. The inclination of the slant shaft 9a with respect to the secondary shaft 9 is approximately 14°. A sub shaft 11 is attached to the front end of the slant shaft 9a. The sub shaft 11 is coaxial with the secondary shaft 9. The motor housing 2, the inner cover 5, and the gear cover 6 cooperatively constitute a housing of the saber saw.

Reciprocating Shaft Supporting Structure

Two axle bolts 12 are opposed and coaxially attached to the front end of the gear cover 6. A guide sleeve 13 is supported at the inner ends of the axle bolts 12 and swingable about the common axis of the axle bolts 12 (refer to FIG. 2). Two opposed rectangular through holes 14 are formed at the rear end of the guide sleeve 13. A change shaft 15 is rotatably installed on the inside wall of the inner cover 5. The change shaft 15 is inserted into the rectangular through holes 14 (refer to FIGS. 1 and 3). More specifically, the change shaft 15 has two symmetric flat surfaces 15a formed at opposite sides of the central region thereof. The flat surfaces 15a extend in a wider region larger than the diameter of the guide sleeve 13. A change lever 16 is securely connected to the axial end of the change shaft 15. The change shaft 15 rotates in accordance with a turning operation of the change lever 16. The rotation of the change shaft 15 selectively allows or restricts the swing motion of the guide sleeve 13.

Rotation-Reciprocation Converting Mechanism

A reciprocative plate 18 has a sleevelike base portion coupled around the slant shaft 9a via two bearing rings 17. The reciprocative plate 18 has a swing shaft 18a integrally extending from the sleevelike base portion in the radial direction. A ball portion 18b is formed at the distal end of the swing shaft 18a. A cylindrical bearing metal 19 is press fitted into the front end portion of the cylindrical guide sleeve 13. A plunger 20 reciprocates along the cylindrical inner wall of the bearing metal 19. The plunger 20 has a larger-diameter portion 20a at the rear end thereof. A slight clearance is provided between the larger-diameter portion 20a and the cylindrical inner wall of the guide sleeve 13. The swing shaft 18a of the reciprocative plate 18 is inserted into upper and lower openings formed on the larger-diameter portion 20a of the plunger 20. An upper opening 20b of the larger-diameter portion 20a is loosely coupled with the ball portion 18b of the swing shaft 18a. The ball portion 18b can roll along the cylindrical edge of the upper opening 20b. The lower opening of the larger-diameter portion 20a is widely opened so that the swing movement of the swing shaft 18a is not blocked by the lower opening of the larger-diameter portion 20a. With the above-described arrangement, the rotational motion of the secondary shaft 9 is converted into a reciprocative motion of the plunger 20.

Blade Attaching & Detaching Mechanism

A blade attaching portion 20c is formed at the front end of the plunger 20. The blade attaching portion 20c comprises a slit 20d into which a blade 27 is inserted and locked by a stepped blade locking pin 30. Cylindrical blade holders 28 and 29 are provided around the blade attaching portion 20c. The blade holder 28 is axially shiftable toward the rear end of the plunder 20 while it rotates against a resilient force. The stepped blade locking pin 30 retracts in response to the axially rearward and rotational movement of the blade holder 28. This mechanism allows the user to insert the blade 27 into the slit 20d when the user holds the blade holder 28 at the rearward position. When released, the blade holder 28 shifts in the axially forward direction and returns its home position while it rotates in the opposite direction. With this returning motion, the stepped blade locking pin 30 engages the blade 27 and firmly fixes the blade 27 in the slit 20d of the plunger 20. Regarding the direction of the blade 27, this blade holding mechanism allows the user to set the blade 27 upside down when attaching it to the blade attaching portion 20c of the plunger 20. The applicants' earlier Japanese patent application JP 10-301923, corresponding to the U.S. patent application Ser. No. 09/426,646 filed Oct. 25, 1999, discloses the more detailed structure for the blade attaching and detaching mechanism.

Swing Sawing Mechanism

A roller shaft 21 is provided so as to penetrate the rear part of plunger 20. Both ends of the roller shaft 21 are supported by swing rollers 22. Upper and lower swing rails 23, extending in the axial direction of the plunger 20, are provided at upper and lower sides of each swing roller 22 so as to guide the swing roller 22. Each swing rail 23 is securely fixed to the inner cover 5 and the gear cover 6. When the change shaft 15 is set to an allowable position, each swing roller 22 rolls along an inclined surface of the corresponding swing rail 23. With this arrangement, the plunger 20 can cause a reciprocative and swing motion. A base 25 is attached to the front end of the gear cover 6 and is shiftable in the axial direction via a fixing lever 26. The base 25 stabilizes the position of the saber saw with respect to a material to be cut by the saber saw. The applicants' earlier Japanese patent application JP 10-301923, corresponding to the U.S. patent application Ser. No. 09/426,646 filed Oct. 25, 1999, discloses the more detailed structure for the swing sawing mechanism.

Front Holding Structure

A front cover 24a covers the outer surface of the motor housing 2, the inner cover 5 and the gear cover 6. The front cover 24a consists of a right half and a left half separated about a vertical plane including the axis of the plunger 20 (i.e., a vertical plane lying in the axial direction of the saber saw). A plurality of screws (not shown) are used to fix the front cover 24a. The material of front cover 24a is a high-strength plastic which is electrically and thermally insulating and rigid. For example, the front cover 24a is made of the engineering plastic such as polycarbonate plastic. A larger-diameter portion (or a flange-like portion) 24f is formed integrally at the front end of the front cover 24a. This larger-diameter portion 24f prevents the user's hand from slipping toward the blade 27. A resilient member 24c, which is electrically and thermally insulating and has a large friction coefficient, extends along the outer surface of the front cover 24a partly so as to form a front-end grip 24h (refer to a shaded portion shown in FIG. 5). The friction coefficient of the resilient member 24c is larger than that of the front cover 24a. For example, the resilient member 24c is a rubber. In practice, it is preferable to bond the resilient member 24c onto the outer surface of the front cover 24a. Alternatively, by using the injection molding, it is possible to form a double-layered structure of the resilient member 24c and the front cover 24a.

Figure 4:
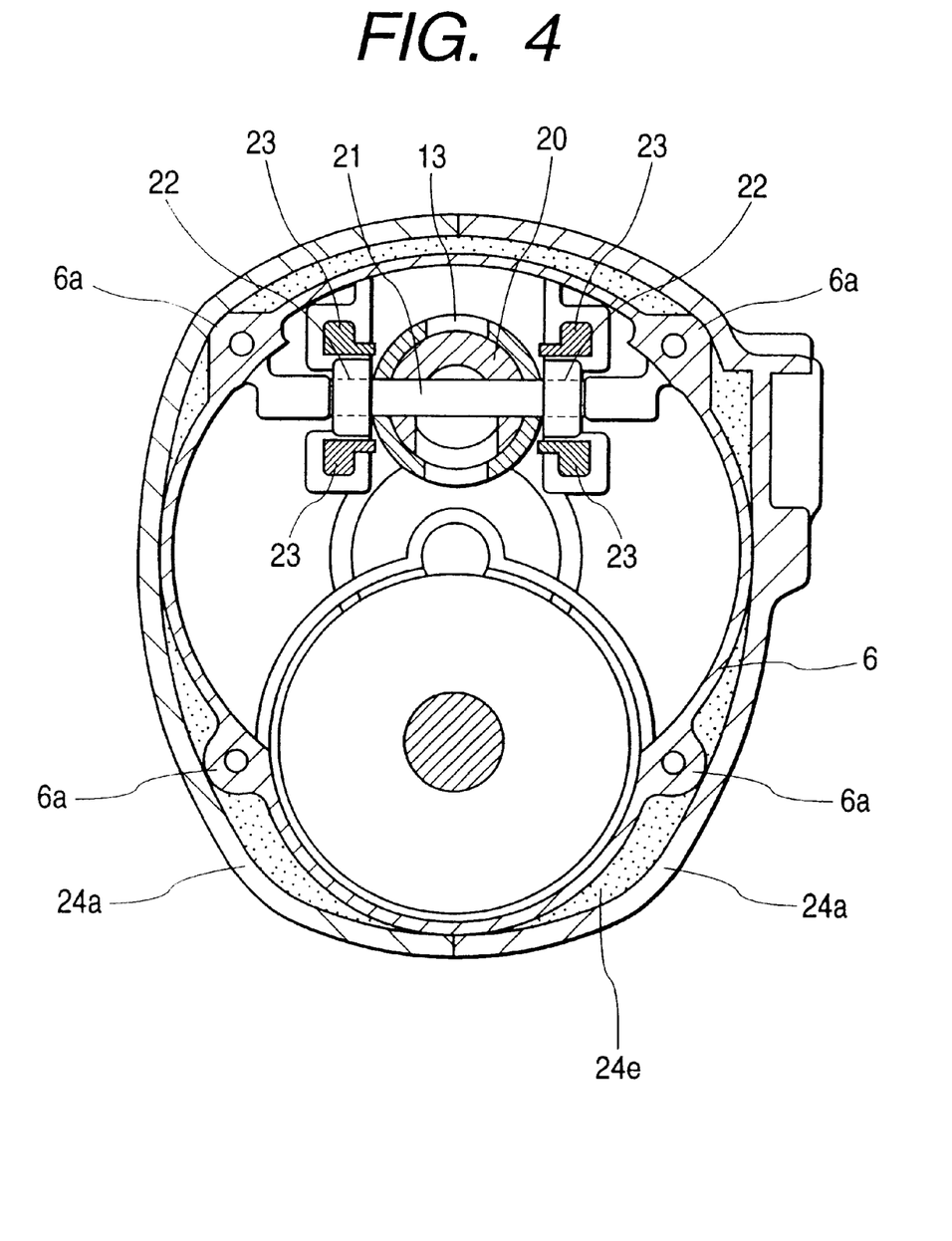
FIG. 4 is a vertical cross-sectional view of the saber saw taken along a line IV—IV shown in FIG. 1.

As shown in FIG. 4, the gear cover 6 is brought into contact with the inside surface of front cover 24a at four screw boss portions 6a which are angularly and substantially equally spaced when seen in the axial direction of the plunger 20. A clearance formed between the front cover 24a and the gear cover 6, except for the contact-portions of the front cover 24a and the screw boss portions 6a, serves as a ventilation space 24e (refer to dotted regions shown in FIG. 4).

Figure 2:
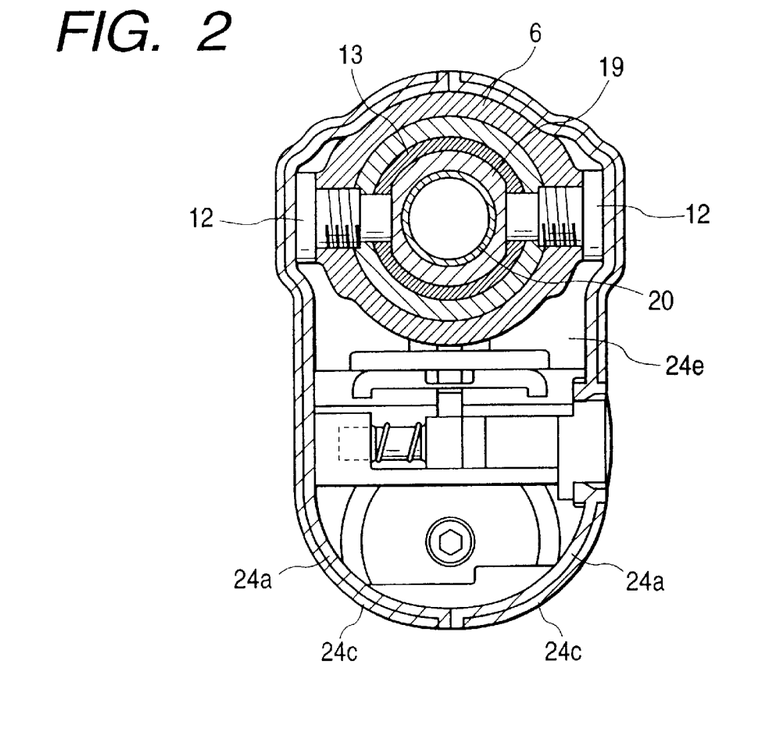
FIG. 2 is a vertical cross-sectional view of the saber saw taken along a line II—II shown in FIG. 1.
Figure 3:
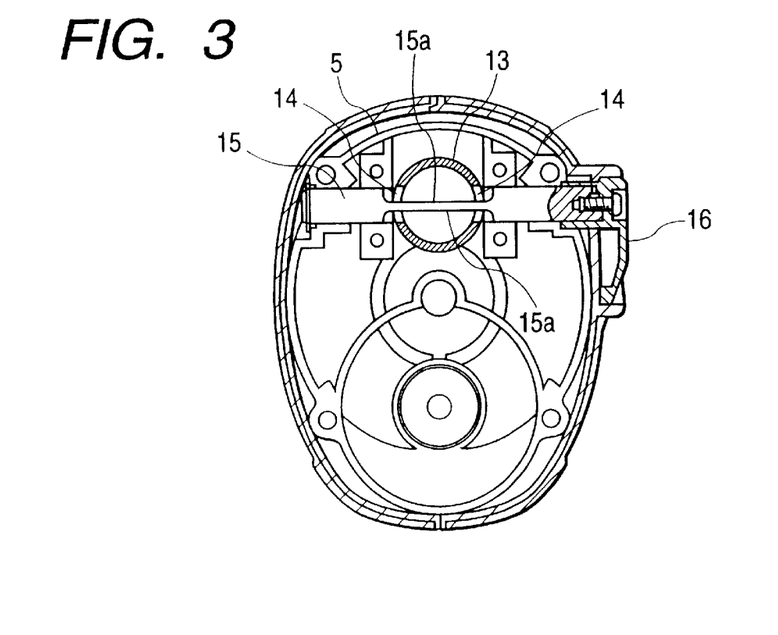
FIG. 3 is a vertical cross-sectional view of the saber saw taken along a line III—III shown in FIG. 1.
Figure 6:
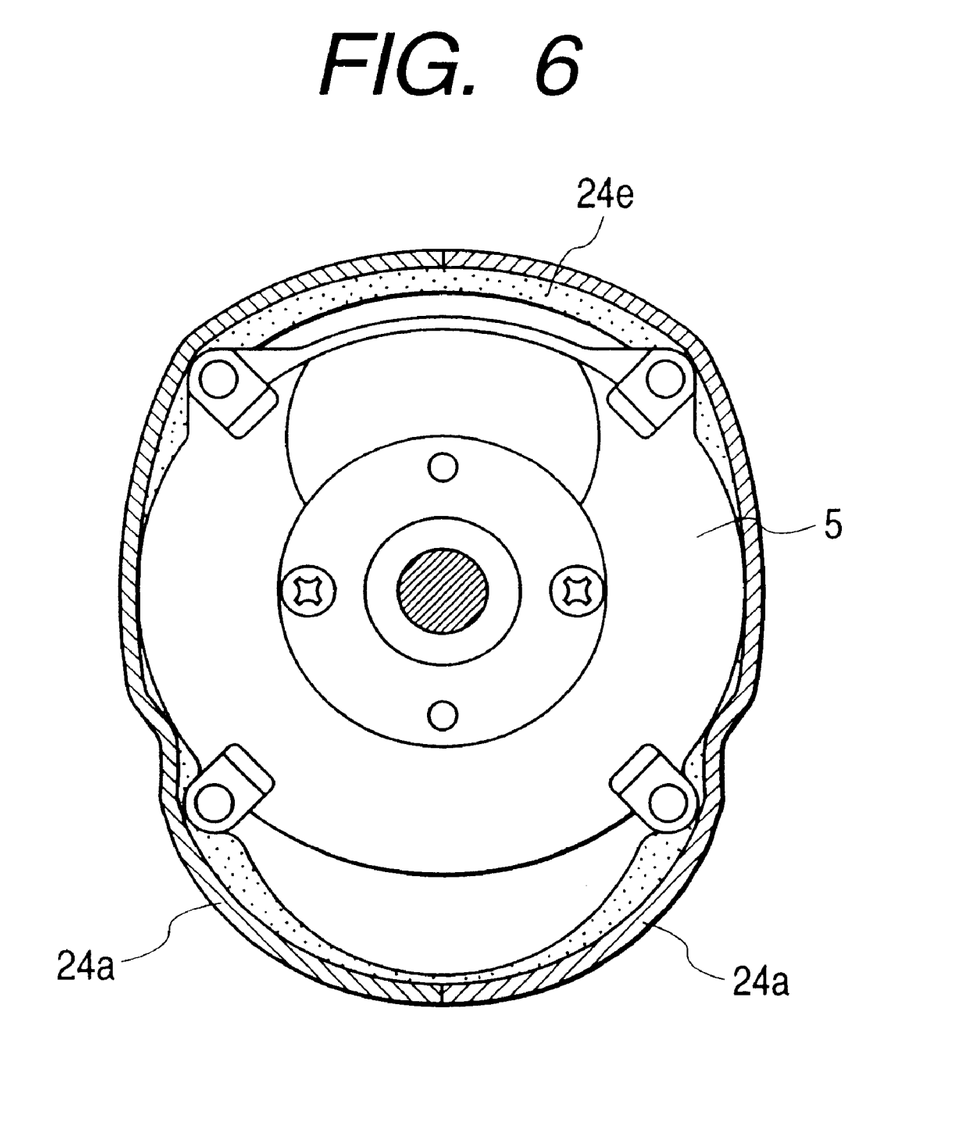
FIG. 6 is a vertical cross-sectional view of the saber saw taken along a line VI—VI shown in FIG. 1.

The ventilation space 24e extends in the axial direction of the saber saw as shown in FIGS. 1, 2, and 6. The rear end of ventilation space 24e (refer to FIG. 6) communicates with the ventilation outlet 2a of the electric motor 1 provided at the connecting portion of the motor housing 2 and the inner cover 5. The front end of ventilation space 24e (refer to FIG. 1) communicates with the outside. Accordingly, the cooling air flows into the ventilation space 24e can cool the outer wall of the gear cover 6.

As the front cover 24a is made of a high-strength plastic, it is sufficiently durable against the pressing force given by the user during the cutting operation or against the reaction force returning from the material to be cut.

The front cover 24a has at least one inner rib 24g integrally protruding inward from the inner wall of the front cover 24a. The inner rib 24g is engaged with a stepped or shoulder portion of the inner cover 5. The inner rib 24g prevents the front cover 24a from shifting in the axially forward direction, thereby securely fixing the front cover 24a.

Operation of Saber Saw

Figure 7:
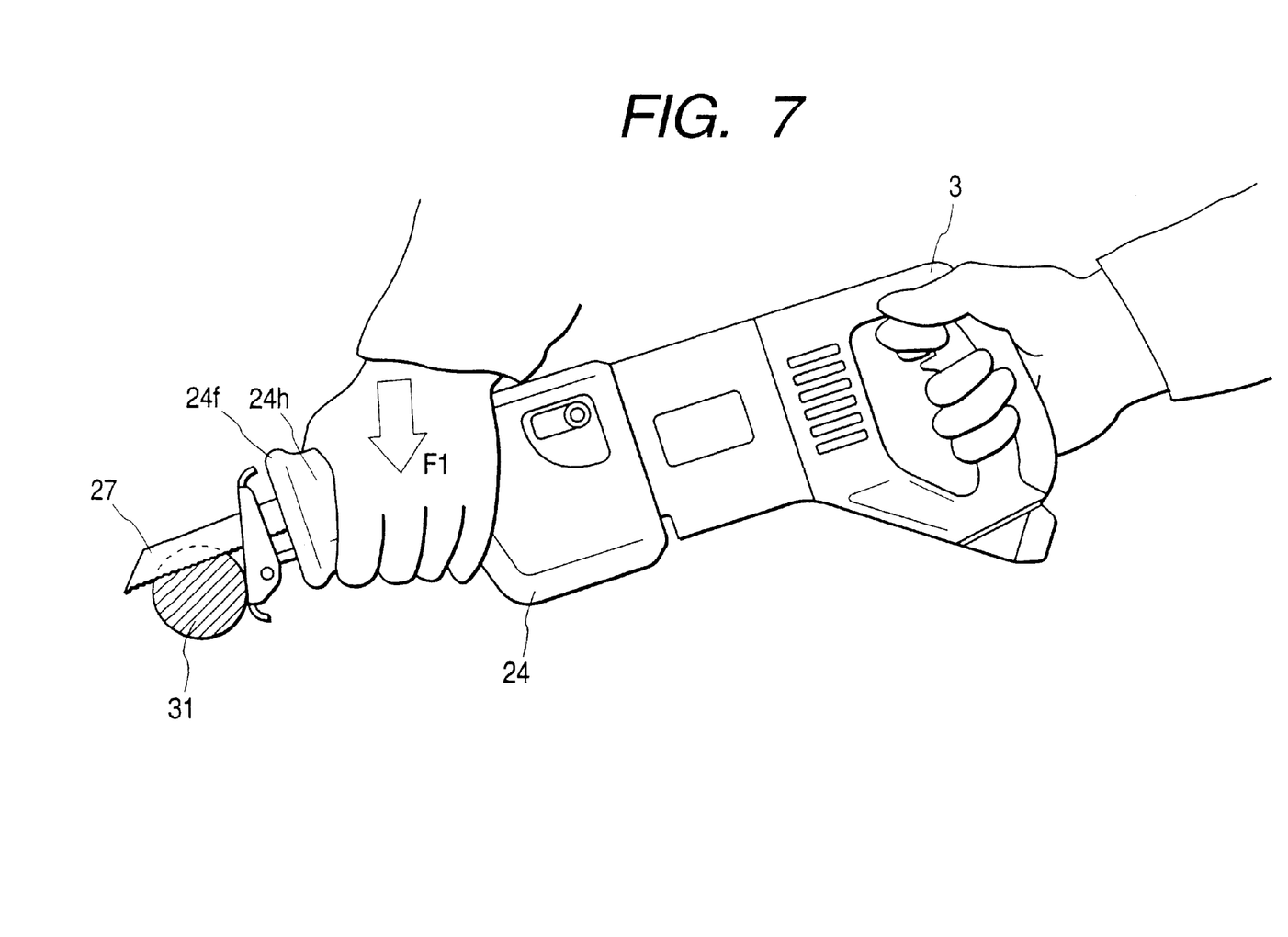
FIG. 7 is a view illustrating a cutting operation of the saber saw held by a user.

In a cutting or sawing operation, the user holds the front-end grip 24h by one hand while the other hand holds the handle 3. The blade 27 is placed on a material 31 to be cut. Under this condition, a pressing force F1 is applied to the front-end grip 24h to give a cutting force to the blade 27, as shown in FIG. 7.

The saber saw of the present invention brings the following effects.

First, as the front-end grip 24h (i.e., resilient member 24c) and the front cover 24a cooperatively constitute a double-layered structure, it becomes possible to provide a rigid insulating cover structure for the saber saw.

Second, as the front-end grip 24h (i.e., resilient member 24c) has a large friction coefficient, the front-end grip 24h prevents the user's hand from slipping out of the front-end grip 24h. Thus, the saber saw of the present invention improves the safety of the user during the cutting operation, although the front-end grip 24h is adjacent to the blade 27.

Third, as the front-end grip 24h (i.e., resilient member 24c) is thermally insulating, the front-end grip 24h effectively protects the user's hand against heat generated by the mechanical friction between the reciprocating plunger 20 and the bearing metal.

Fourth, as the front-end grip 24h (i.e., resilient member 24c) is electrically insulating, the front-end grip 24h effectively protects the user's hand against the electric shock, even when the blade 27 cuts through live electric wiring.

This invention may be embodied in several forms without departing from the spirit of essential characteristics thereof. The present embodiment as described is therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A saber saw comprising:
    a motor with a cooling fan;
    the motor having a shaft;
    a secondary shaft driven in response to rotation of the motor shaft;
    a plunger causing a reciprocative motion and having a front end to which a blade is attached;
    a motion converting mechanism interposed between said secondary shaft and said plunger for converting a rotational motion of said secondary shaft into a reciprocative movement of said plunger;
    a housing enclosing the secondary shaft, plunger and motion converting mechanism;
    a front cover, made of an electrically and thermally insulated material, for covering an outer surface of said housing; and
    a resilient member, which is electrically and thermally insulating, extending along an outer surface of said front cover partly so as to form a front-end grip to be held by a user, wherein said resilient member and said front cover cooperatively constitute a double-layered structure surrounding at least part of said housing.

2. The saber saw in accordance with clam 1, wherein said front cover is made of a rigid material sufficiently durable against a force imparted thereon during an operation of the saber saw.

3. The saber saw in accordance with claim 1, wherein a friction coefficient of said resilient member is greater than a friction coefficient of said front cover.

4. The saber saw in accordance with clam 1, wherein said front cover is a high-strength plastic and said resilient member is a rubber.

5. The saber saw in accordance with clam 1, wherein said front cover consists of a right half and a left half separated about a vertical plane lying in an axial direction of said saber saw.

6. The saber saw in accordance with clam 1, wherein said housing comprises a motor housing accommodating said motor, an inner cover positioned next to said motor housing for supporting a front end of a motor shaft and a rear end of said secondary shaft, and a gear cover positioned next to said inner cover for accommodating said secondary shaft, said plunger, and said motion converting mechanism.

7. The saber saw in accordance with clam 6, wherein a clearance between said front cover and said gear cover serves as a ventilation space for allowing cooling air to flow therethrough.

8. The saber saw in accordance with clam 1, wherein said resilient member is bonded onto said front cover.

9. The saber saw in accordance with claim 1, wherein said resilient member and said front cover are integrally formed.

* * * * *

UNITED STATES PATENT AND TRADEMARK OFFICE
CERTIFICATE OF CORRECTION

| | | |
|---|---|---|
| PATENT NO. | : 6,523,267 B1 | Page 1 of 1 |
| DATED | : February 25, 2003 | |
| INVENTOR(S) | : Yoshio Osada et al. | |

It is certified that error appears in the above-identified patent and that said Letters Patent is hereby corrected as shown below:

<u>Title page, Item [54] and Column 1, line 1,</u>
Should read as follows: -- HEAT DISSIPATION AND INSULATION COVER FOR A SABER SAW --

Signed and Sealed this

Fifth Day of August, 2003

JAMES E. ROGAN
*Director of the United States Patent and Trademark Office*